United States Patent [19]

Koyama et al.

[11] Patent Number: 4,770,959
[45] Date of Patent: Sep. 13, 1988

[54] LITHIUM-FLUORINATED GRAPHITE CELL

[75] Inventors: Satoshi Koyama, Osaka; Tadayuki Maeda, Settsu; Kazuo Okamura, Itami, all of Japan

[73] Assignee: Daikin Kogyo Co., Ltd., Osaka, Japan

[21] Appl. No.: 943,849

[22] Filed: Dec. 19, 1986

Related U.S. Application Data

[63] Continuation of Ser. No. 749,899, Jun. 28, 1985, abandoned.

[30] Foreign Application Priority Data

Jun. 29, 1984 [JP] Japan ................... 59-135579

[51] Int. Cl.$^4$ .............................. H01M 6/16
[52] U.S. Cl. ..................... 429/194; 429/218
[58] Field of Search ............. 429/194, 197, 218

[56] References Cited

U.S. PATENT DOCUMENTS

| | | |
|---|---|---|
| 3,639,174 | 2/1972 | Kegelman ............... 429/194 |
| 3,871,916 | 3/1975 | Kronenberg . |
| 3,907,597 | 9/1975 | Mellors ................ 429/197 |
| 3,928,070 | 12/1975 | Gunther ............... 429/194 |
| 3,953,235 | 4/1976 | Blomgren ............. 429/197 |
| 3,985,577 | 10/1976 | Russell . |
| 3,990,915 | 11/1976 | Newman et al. . |

FOREIGN PATENT DOCUMENTS

| | | | |
|---|---|---|---|
| 2503234 | 7/1976 | Fed. Rep. of Germany . | |
| 6165277 | 5/1980 | Japan ................... | 429/197 |
| 0135581 | 8/1983 | Japan ................... | 429/194 |
| 0111267 | 6/1984 | Japan ................... | 429/194 |

Primary Examiner—Donald L. Walton
Attorney, Agent, or Firm—Armstrong, Nikaido, Marmelstein & Kubovcik

[57] ABSTRACT

Organic electrolyte cells comprising a lithium anode and a fluorinated graphite cathode, and using a solution of lithium hexafluorophosphate (LiPF$_6$) in an organic solvent as the electrolyte, whereby the discharge capacity is remarkably improved.

2 Claims, 1 Drawing Sheet

LITHIUM-FLUORINATED GRAPHITE CELL

This application is a continuation of application Ser. No. 749,899 filed June 28, 1985, now abandoned.

BACKGROUND OF THE INVENTION

The present invention relates to an improvement in electrochemical cells having a metallic lithium anode, a fluorinated graphite cathode and an organic electrolyte, and more particularly to organic electrolyte cells using lithium hexafluorophosphate (LiPF$_6$) as the solute of the electrolyte, whereby the discharge capacity is remarkably raised.

Organic electrolyte cells of lithium-fluorinated graphite system are widely employed at present. They have excellent characteristics such as long life, good storability and high voltage.

In these cells, a fluorinated graphite is used as the cathode. Two kinds of fluorinated graphite having a different structure are known at present [cf. Tohara et al. Carbon, No. 117, 98(1984)], one being a fluorinated graphite represented by the formula (CF)$_n$ and the other being a fluorinated graphite represented by the formula (C$_2$F)$_n$. It is known that from the viewpoint of the fluorine content, a higher discharge capacity is obtained by using (CF)$_n$ as the cathode, but (C$_2$F)$_n$ rather exhibits a higher voltage.

The organic solvents used in the organic electrolyte of the lithium-fluorinated graphite cells are in general propylene carbonate and γ-butyrolactone, and lithium tetrafluoroborate (LiBF$_4$) is mainly used as the solute of the electrolyte. Lithium tetrafluoroborate is superior, particularly in low temperature characteristics such that the solubility in organic solvents is high even at low temperature, to lithium perchlorate (LiClO$_4$) which is widely used as the solute in lithium cells having a lithium anode, a metal oxide anode such as manganese dioxide and an organic electrolyte.

Japanese Examined Patent Publication (Tokkyo Kokoku) No. 16133/1974 discloses a cell using a light metal, e.g. lithium, as the anode, a fluorinated graphite as the cathode, and a non-aqueous organic electrolyte containing sodium hexafluorophosphate as the solute. This cell has no improved discharge capacity as compared with other known lithium-fluorinated graphite cells.

It is an object of the present invention to provide an improved lithium-fluorinated graphite electrochemical cell.

A further object of the present inventon is to provide such an organic electrolyte cell having an improved discharge capacity.

These and other objects of the present invention will become apparent from the description hereinafter.

SUMMARY OF THE INVENTION

It has now been found that the discharge capacity can be raised to two or more times that of conventional lithium-fluorinated graphite cells by using lithium hexafluorophosphate as the solute of the organic electrolyte.

In accordance with the present invention, there is provided an improved electrochemical cell comprising a lithium anode, a cathode comprising fluorinated graphite, and an organic electrolyte, the improvement which comprises using lithium hexafluorophosphate (LiPF$_6$) as the solute of said organic electrolyte.

DETAILED DESCRIPTION

Figure 1:
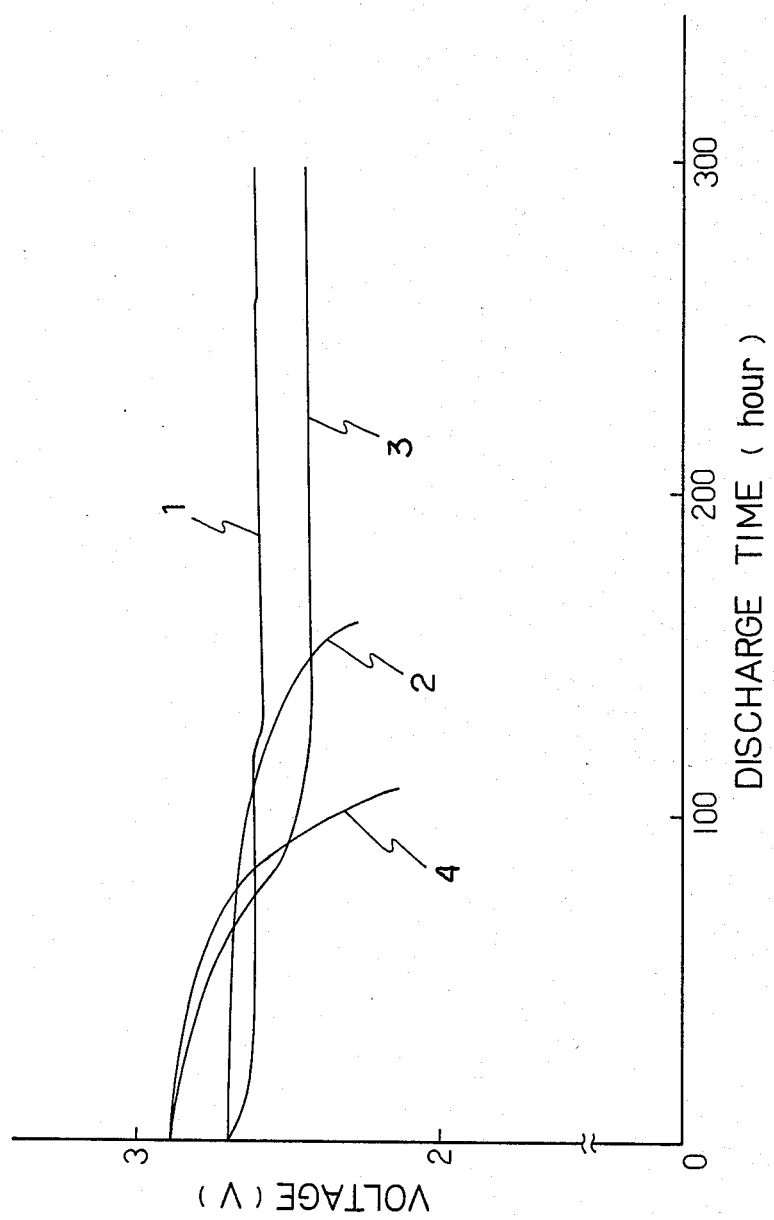
FIG. 1 is a graph showing the relationship between voltage and discharge time of the lithium-fluorinated graphite cells of the present invention and conventional lithium-fluorinated graphite cells.

Lithium metal is employed as the active anode material. The anode can be prepared by known methods, and may be in any known forms.

All fluorinated graphites prepared by reacting a carbon material, e.g. graphite, with fluorine gas in accordance with known methods can be used as the active cathode material in the present invention, e.g. polycarbonfluoride compounds represented by the formulas (CF)$_n$ and (C$_2$F)$_n$. The fluorinated graphite compounds may be employed alone or in admixture thereof. The fluorinated graphite compounds (CF)$_n$ can be prepared from any carbon materials such as petroleum coke, carbon black, graphite and carbon fiber, and all of them are usable in the invention. The fluorinated graphite compounds (C$_2$F)$_n$ are usually prepared from crystalline carbon materials. Although the characteristics thereof vary depending on the crystallinity of the starting carbon materials, all of them are usable in the invention.

The cathode used in the cell of the present invention can be prepared by known methods. In general, the cathode is prepared by mixing the fluorinated graphite with an electrically conductive material and a binder and molding the mixture into a desired electrode shape. The electrically conductive material includes, for instance, electrically conductive carbon black such as acetylene black, natural graphite, exfoliated graphite, and the like. Polytetrafluoroethylene is preferably employed as the binder, but all resins which are insoluble in the organic solvent used in the electrolyte, can be used as the binder without any restriction. The binder may be employed by previously coating the surface of the fluorinated graphite powder or merely mixing with the fluorinated graphite powder.

The electrolyte used in cells of the present invention is a solution containing lithium hexafluorophosphate (LiPF$_6$) as a solute dissolved in an organic solvent. Propylene carbonate, γ-butyrolactone, tetrahydrofuran and 1,2-dimethoxyethane are usually employed as the organic solvent. In addition, other organic solvents which are not substantially reactive with the cathode, anode and solute and which can sufficiently dissolve the solute, can be employed in the invention without any restriction. It is desirable to prevent introduction of moisture into cells as much as possible, since the lithium metal of the anode is oxidized by the moisture. Lithium hexafluorophosphate is hygroscopic and the dehydration thereof is difficult. Accordingly, it is preferable to employ LiPF$_6$ synthesized in a dry atmosphere by a reaction which does not produce water.

The concentration of LiPF$_6$ in the organic electrolyte is at least 0.1 mole/liter, preferably from 0.1 mole/liter up to the molar concentration corresponding to the solubility in the solvent used.

The cells of the present invention have a discharge capacity of about 2 or more times that of conventional lithium-fluorinated graphite cells. This discharge capacity value far exceeds the theoretically calculated discharge capacity based on the amount of fluorinated graphite used. The reason is not made clear, but it is considered that $PF_6$-ion present in the electrolyte participates in discharge. In other words, it is considered that not only $LiPF_6$ acts as the electrolyte, but also a part or all of it acts as an active material. Such an action of $LiPF_6$ as an active material has not been expected at all.

The present invention is more specifically described and explained by means of the following Examples, in which all % and parts are by weight unless otherwise noted. It is to be understood that the present invention is not limited to the Examples, and various changes and modifications may be made in the invention without departing from the spirit and scope thereof.

EXAMPLE 1

A cathode containing 50 mg of an active material was prepared by thoroughly mixing 10 parts of a white fluorinated graphite (fluorine content: 62.0%) obtained by reaction of petroleum coke with fluorine gas at 400° C., 3 parts of polytetrafluoroethylene powder and 1 part of acetylene black. and press-molding the mixture on a nickel screen. The apparent surface area of the cathode was 1.57 cm$^2$ An anode having an apparent surface area of 2 cm$^2$ was prepared by cutting out a sheet from a lithium block and supporting the sheet on a nickel screen. A 1 mole/liter solution of $LiPF_6$ in $\gamma$-buyrolactone was used as an electrolyte.

A cell was assembled using the above cathode, anode and electrolyte, and the discharge voltage thereof was measured. The measurement was made at 25° C. by fixed resistance discharge of 10 kiloohms.

The change in terminal voltage with the lapse of time is shown in FIG. 1 wherein curve 1 is for the cell obtained in this Example.

COMPARATIVE EXAMPLE 1

The procedure of Example 1 was repeated except that a 1 mole/liter $\gamma$-butyrolactone solution of $LiBF_4$ was employed instead of the 1 mole/liter $\gamma$-butyrolactone solution of $LiPF_6$.

The result is shown in FIG. 1 wherein curve 2 is for the cell obtained in this Comparative Example.

EXAMPLE 2

A cathode was prepared in the same manner as in Example 1 except that a fluorinated graphite (fluorine content: 52.8%) containing $(C_2F)_n$ as a main component obtained by reaction of artificial graphite with fluorine gas at 380° C. An electrolyte was prepared by dissolving $LiPF_6$ in a mixed solvent of $\gamma$-butyrolactone and acetonitrile to give a 0.54 mole/liter solution of $LiPF_6$. The concentration of acetonitrile in the electrolyte was 1.72 mole/liter. A cell was prepared in the same manner as in Example 1 except that the above cathode and electrolyte were employed, and the discharge voltage was measured.

The result is shown in FIG. 1 wherein curve 3 is for the cell obtained in this Example.

COMPARATIVE EXAMPLE 2

The procedure of Example 2 was repeated except that a 1 mole/liter $\gamma$-butyrolactone solution of $LiBF_4$ was employed as the electrolyte.

The result is shown in FIG. 1.

As is clear from FIG. 1 wherein curves 1, 2, 3 and 4 show the discharge characteristics of the cells obtained in Example 1, Comparative Example 1, Example 2 and Comparative Example 2, respectively, the discharge time of the cells of the present invention is not less than 2 times the discharge time of the cells of the Comparative Examples. A small drop in voltage level is observed at about 130 hour discharge in curve 1, and it is considered that an active material other than fluorinated graphite, namely $LiPF_6$, contributes to discharge thereafter.

In addition to the ingredients used in the Example, other ingredients can be used in the Examples as set forth in the specification to obtain substantially the same results.

What we claim is:

1. In an electrochemical cell comprising a lithium anode, a cathode comprising fluorinated graphite, and an organic electrolyte, wherein said organic electrolyte comprises a solute and a solvent, the improvement which comprises using lithium hexafluorophosphate ($LiPF_6$) as the solute of said organic electrolyte and using as the solvent of said organic electrolyte a solvent consisting essentially of a member selected from the group consisting of propylene carbonate, $\gamma$-butyrolactone, tetrahydrofuran and 1,2-dimethoxyethane.

2. In an electrochemical cell comprising a lithium anode, a cathode comprising fluorinated graphite, and an organic electrolyte, wherein said organic electrolyte comprises a solute and a solvent, the improvement which comprises using lithium hexafluorophosphate ($LiPF_6$) as the solute of said organic electrolyte and using as the solvent of said organic electrolyte a solvent consisting essentially of a mixture of $\gamma$-butyrolactone and acetonitrile.

* * * * *